United States Patent Office 3,531,538
Patented Sept. 29, 1970

3,531,538
PREVENTION OF FOULING AND HYDRIDING IN ORGANIC COOLANT SYSTEMS
John Hugo Duerksen, Hamilton, Ontario, Allan Robertson Bancroft, Deep River, Ontario, Stanley Ronald Hatcher and John Boulton, Pinawa, Manitoba, and Donald Hector Charlesworth, Deep River, Ontario, Canada, assignors to Atomic Energy of Canada Limited, Ottawa, Ontario, Canada, a company of Canada
No Drawing. Filed Sept. 2, 1965, Ser. No. 484,751
Int. Cl. C07c 7/00
U.S. Cl. 260—674
5 Claims

ABSTRACT OF THE DISCLOSURE

Fouling and zirconium alloy hydriding in organic coolant systems are prevented by repeatedly (a) contacting the coolant at elevated temperatures with a palladium catalyst or Mg metal or (b) venting-degassing the coolant at above about 200° C., preferably in combination.

This invention relates to the prevention of fouling or the formation of deposits on internal surfaces in contact with liquid organic coolants, particularly in nuclear reactors. Where zirconium or its alloys are used in the coolant system the invention also provides a method of minimizing detrimental hydriding of such materials. According to the invention the chlorine concentration in the system is maintained below about 5 p.p.m. by contacting the coolant with certain palladium materials or magnesium metal and also or alternatively, venting or degassing.

The deposition of solids on heat transfer surfaces from organic coolants has been regarded as a serious drawback to the use of liquid organic coolants operating at high temperatures e.g. 300–500° C. in a nuclear reactor. This deposition or fouling seriously cuts down on the heat transfer, increasing fuel temperature, and eventually retards the flow of coolant, increasing the pressure drop.

Zirconium alloys such as Zircaloy-2, Zircaloy-4 and zirconium-2.5% Nb have desirable properties which would render them useful in reactor coolant circuits subject to high temperatures. In many tests, in organic coolants, zirconium alloys have been found to have very high rates of hydrogen pickup which causes loss in tensile strength and other properties.

Available data suggest a mass-transfer fouling mechanism involving iron transport as an iron-chlorine-organic complex which abstracts iron from the system walls and deposits it on hot surfaces by partial thermal decompositions. The complexing agent is carried around again to pick up another load of iron. While other impurities may contribute to mass transfer fouling at low rates, reactive chlorine species are by far the most important.

Investigation has confirmed that chlorine is by far the most important of the impurities in the coolant affecting mass-transfer fouling of all heat transfer surfaces and also hydriding of zirconium alloys.

In accordance with the present invention the concentration of chlorine in the organic coolant is maintained at less than about 5 p.p.m. or preferably not more than about 3 p.p.m. Exclusion of chlorine from a reactor system can not be guaranteed and various methods for removing chlorine contamination have been investigated. During the investigation it has been observed that most of the chlorine which enters a coolant system resides on any steel walls. Thus, removal of the chlorine should involve its transfer from the walls as well as its extraction from the coolant at low concentrations. The coolant system can be drained and flushed, but surface contamination with chlorine may still be present and produce a high fouling rate.

The methods which have been found most effective for removing chlorine and maintaining very low concentrations thereof are contacting the coolant with a palladium catalyst or magnesium metal at elevated temperatures. Venting or degassing the coolant at elevated temperatures as in a surge tank or other suitable means has also been found to remove volatile chlorine compounds responsible for fouling and hydriding. Combination of treatment with Pd or Mg and venting or degassing is recommended.

The Pd catalyst is normally used on a support or base and alumina or silica gel have been found particularly effective for this purpose. The amount of Pd required depends on the amount of impurity and may vary widely. Normally about 0.2 to about 2 grams Pd per 100 kg. coolant is used. The amount of Pd relative to the support may range from about 0.1 to 2%, preferably 0.5%. The amount of Mg normally used may range from about 0.2 g. to about 3 g. per 100 kg. coolant. The temperature of contact with these metals should preferably be at least about 200° C. for Pd and at least about 300° C. for Mg. The Pd pellets are normally preferred since they are more effective at lower temperatures and remove a larger variety of chemical forms of chlorine. When used upstream of a clay column with a mass velocity of 5–10 kg./cm.$^2$ hr. through the bed of pellets, chlorine concentrations near 3 p.p.m. can be maintained. The removal capacity is indicated at 1.2 g. Cl/g. Pd from high chlorine coolant and 0.1 g. Cl/g. Pd from coolant containing 3–10 p.p.m. The maximum capacity apparently corresponds to a Cl/Pd atomic ratio of 3.6. In systems where steel is exposed to the coolant, iron is usually removed with the chlorine in a Cl/Fe atomic ratio of about 2.

The venting or degassing may be carried out at volatilization temperatures in tank or column means which can be vented to the atmosphere and desirably purged with an inert gas such as nitrogen. A temperature of at least about 200° C., preferably at least 300° C., is usually necessary to volatilize the organic chlorine compounds.

The coolant purification circuit (outside the reactor) will usually include surge tank means for venting and degassing, clay adsorption columns and any suitable liquid-solid contact apparatus (for contact with the Pd or Mg). Coolant from the reactor desirably will pass through the surge tank means and contact the Pd or Mg chlorine remover before reaching the clay adsorption column. Alternatively, parallel circuits may be used for the chlorine remover and the clay column.

The organic coolants used may be high molecular weight aromatic compounds or mixtures thereof such as biphenyl, terphenyl, and hydrogenated terphenyls. The coolants used in the following examples were usually mixtures of hydrogenated terphenyls and terphenyls such as Santowax OM (e.g. ortho-terphenyl—64%, meta—25%, para—2.3% and biphenyl 2%). Tests have been done on clean coolants contaminated with different chlorine compounds, on coolants with chlorine contamination of unknown origin and on clean coolants introduced into a system containing steel with known chlorine contamination. It has been found that the fouling rate is related to the chlorine impurity concentration in the system as well as its nature. The fouling rate is more easily related to the total chlorine content of the system than to its concentration in the coolant due to the great affinity of the system surfaces for chlorine. Once on the system walls the chlorine can still contribute to the fouling process but will not appear in the coolant analyses. The chlorine contamination in the examples was in the form of trichloroethylene, chlorobiphenyl, chloroterphenyl, chlorobenzene, hydrochloric acid, ferric chloride or unknown organic chlorine compounds.

Unless otherwise noted the following experiments were conducted in small loops containing in series: a heater, specimen holder, high temperature test section, vented surge tank, and pump; in which approximately 1.5 kg. of coolant were recirculated at 400° C. and 525 p.s.i.g. This apparatus is more fully described in U.S. Ser. No. 484,594 filed Sept. 2, 1965 by Stanley Ronald Hatcher and John Boulton entitled Protection of Zirconium Alloys Against Hydriding in Organic Coolants.

EXAMPLE 1

Screening tests were conducted to determine the most suitable means of removing chlorine impurities. As shown in Table 1 a comparison of chlorine removal by solids showed that magnesium ribbon and palladium-on-alumina catalysts were particularly effective.

TABLE 1

| Cl remover | Feed chlorine, p.p.m. | Percent of feed chlorine removed from coolant | Time, hr. |
|---|---|---|---|
| CaH₂ | 10 | 27 | 72 |
| LiNH₂ | 25 | 0 | 24 |
| Fe₃O₄ | 25 | 0 | 72 |
| Li | 10 | 0 | 24 |
| Ca | 10 | 42 | 48 |
| Fe | 25 | 0 | 72 |
| Fe | 10 | 38 | 72 |
| Ag | 25 | 0 | 72 |
| Ag–HS [1] | 39 | [2] 88(39) | 144 |
| Al | 39 | 58(6) | 144 |
| Zn | 10 | 44 | 72 |
| Raney Ni | 150 | 82 | 72 |
| Mg | 180 | 88(50) | 24 |
| Mg | 10 | 42 | 24 |
| Mg | 150 | 97(32) | 72 |
| Pd–Al₂O₃ | 150 | 83(40) | 72 |
| Pd–Al₂O₃ | 180 | 78(35) | 24 |
| Pd–Al₂O₃ | 10 | 71 | 72 |

[1] Ag–HS indicates higher surface area than Ag.
[2] Figures in brackets give percent feed chlorine on remover.

EXAMPLE 2

The effect of the catalyst support for the palladium was further investigated. Results are shown in Table 2 which indicate that the catalyst support is important to chlorine removal, with alumina and silica gel being the most effective investigated. Alumina and asbestos by themselves were not effective in removing chlorine (as chlorinated biphenyl).

TABLE 2.—EFFECT OF PALLADIUM SUPPORT ON CHLORINE REMOVAL

Capsule temperature=315°C.
Gilotherm OM2, 1,200 mg. Cl/kg. (a Euratom terphenyl mixture contaminated with chlorinated benzene during its synthesis.)

| Support | Weight Total, g. | Weight Pd, mg. | Test time, hr. | Cl contained on remover Percent of feed | Cl contained on remover Mq. Cl/mg. Pd |
|---|---|---|---|---|---|
| None | 0.1 | 100 | 168 | 0.2 | 0.001 |
| Al₂O₃ | 0.3 | 1.5 | 96 | 3 | 1.0 |
| Asbestos | 0.7 | 35 | 192 | 0.4 | 0.006 |
| Charcoal | 0.5 | 2.5 | 72 | 0.6 | 0.12 |
| Silica gel | 0.5 | 1.5 | 72 | 2 | 0.60 |

Coolant contaminated with trichloroethylene was passed through a bed of chlorine removal agent ⅝ inch diameter by 12 inches long at temperatures from 200 to 400° C. and flow rates of 15 to 25 g./min. The change in chlorine concentration across the bed, and the percentage of chlorine removed from the coolant which was absorbed on the removal agent, were measured. The chlorine removal agents employed were (a) 0.5 wt. percent Pd on alumina cylindrical pellets ⅛ inch diameter by ⅛ inch long, and (b) magnesium ribbon 0.006 inch thick by ⅛ inch wide.

Table 3 compares the efficiency of chlorine removal and recovery on the removal agents with a feed concentration of 10 to 20 p.p.m. chlorine.

TABLE 3

| Packing | Pd/Al₂O₃ | Mg. ribbon |
|---|---|---|
| Temp., °C | 200 | 200 |
| Removal efficiency, percent | 65 | 10 |
| Recovery efficiency on packing, percent | 100 | 15 |
| Temp., °C | 300 | 300 |
| Removal efficiency percent | 87 | 25 |
| Recovery efficiency on packing, percent | 100 | 26 |
| Temp., °C | | 400 |
| Removal efficiency, percent | | 41 |
| Recovery efficiency on packing, percent | | 81 |

EXAMPLE 4

This example illustrates the effects of contact with Pd and venting-degassing on fouling.

The first in the series, Test 1, provided background information, as there was no attempt to remove chlorine during the test. Successive fouling tests were done on the original charge (1500 g.) of coolant by replacing and fouling probe using Dry Ice to freeze plugs of coolant to prevent the coolant from draining out.

Test 2 was done on a new batch of the same coolant as was used for Test 1. During this run coolant flowed through the surge tank (a larger one than was used for standard fouling tests) and volatile chlorine compounds were removed to the vapour space in the tank. Chlorine was, therefore, removed from the fouling system.

Test 3 was different from the second in that the coolant downstream of the probe was split into two parallel streams, one of which was through a bed of catalyst, palladium-on-alumina as one-eighth-inch right cylinders. A fresh batch of catalyst was used for each of the five parts of the test.

Test 4 was done with the full flow of coolant through the catalyst bed. As before the catalyst was changed for each part of the test.

At the end of each series of tests the mild steel inserts were removed and anlyzed for the amount of chlorine adhering to them. Nitric acid was used to rinse out the stainless steel loop piping to recover chlorine that had deposited on it. Each batch of palladium pellets was analyzed for its chlorine content. The results of these analyses are included in Table 4.

The fouling rate was reduced by removal of Cl from the coolant both by volatilization to the vapour space and by retention of the Pd. The steady-state concentration of chlorine in the coolant necessary for high fouling rates was not high (see Test 1–3).

A further series of results is given in Table 4A.

TABLE 4A.—EFFECT OF CHLORINE REMOVAL ON FOULING RATE OF ORGANIC COOLANT

| Initial chlorine conc., p.p.m. | Final chlorine conc., p.p.m. | Chlorine removal agent | Fouling rate, μ gm./ cm.² hr. |
|---|---|---|---|
| 4 | 2 | None | 19 |
| 4 | 2 | Pd/Al₂O₃ | 6.4 |
| 6 | 2 | Pd/Al₂O₃ | 3.3 |
| 40 | 24 | None | 140 |
| 40 | 4.7 | Venting surge tank | 0.5 |
| 40 | | Mg | 12.7 |
| 40 | 36 | Pd/Al₂O₃ | 4.6 |

EXAMPLE 5

Volatile chlorides can be efficiently removed from the coolant by venting or degassing. For instance, in one test about 700 gms. of coolant containing about 39 mg. Cl/kg. and 5 mg. Fe/kg. were heated in a glass container to 315° C. for about 10 hours with 55 cm.² of abraded magnesium ribbon and 34 cm.² of palladium-on-alumina catalyst suspended in the vapour phase. During the test the coolant lost essentially all of its original 27 mg.

TABLE 4

| Test No. | Duration, hr. | Fouling rate, μg./cm.²-hr. | Surge tank flow | Coolant analyses | | | | Contacted Pd catalyst | | Cl removed by acid wash at end of test, mg. | Cl on mild steel at end of test, mg. | Chlorine in feed, mg. |
|---|---|---|---|---|---|---|---|---|---|---|---|---|
| | | | | Fe, mg./kg. | | Cl, mg./kg. | | | | | | |
| | | | | Initial, feed 55 | Final | Initial, feed 40 | Final | Fe, mg. | Cl, mg. | | | |
| 1-1 | 70 | 164 | No | 63 | 3.0 | 18 | 2 | (¹) | (¹) | 12 | 2.6 | 60 |
| 1-2 | 70 | 100 | | 30 | 3.5 | 4 | 2 | (¹) | (¹) | | | |
| 1-3 | 69 | 89 | | 16 | 3.0 | 2 | 3 | (¹) | (¹) | | | |
| 1-4 | 95 | 157 | | 10 | 2.0 | 3 | 2 | (¹) | (¹) | | | |
| 2-1 | 69 | 74 | Yes | 44 | 3.0 | 13 | 5 | (¹) | (¹) | 46 | 0.8 | 60 |
| 2-2 | 68 | 10.1 | | 9.5 | 1.0 | 4 | 4 | (¹) | (¹) | | | |
| 2-3 | 70 | 3.7 | | 5.5 | 2.0 | | 3 | (¹) | (¹) | | | |
| 2-4 | 115 | 4.4 | | 21 | 2.0 | | 4 | (¹) | (¹) | | | |
| 3-1 | 43 | 55 | Yes | 6.5 | 1.5 | 5 | 2 | 2.5 | 3.6 | 37 | 0.4 | 60 |
| 3-2 | 68 | 4.5 | | 3.5 | 2.0 | 2 | 2 | 1.0 | | | | |
| 3-3 | 69 | 2.2 | | 4.5 | 0.5 | 2 | 2 | 1.6 | | | | |
| 3-4 | 95 | 1.3 | | 4.0 | 1.0 | 2 | 2 | 0.1 | 1.2 | | | |
| 3-5 | 48 | 3.1 | | 5.5 | 2.5 | 2 | 2 | 0.4 | 0.8 | | | |
| 4-1 | 42 | 14.9 | Yes | 8.5 | 0.5 | 17 | 4 | 4.5 | 5.9 | 24 | 0.3 | 60 |
| 4-2 | 117 | 2.1 | | 8.0 | 1.0 | 14 | 1 | 1.0 | 0.9 | | | |
| 4-3 | 92 | 1.0 | | 6.0 | 1.0 | 2 | 7 | 0.5 | 0.8 | | | |
| 4-4 | 168 | 0.2 | | 5.5 | 1.0 | 2 | 5 | 0.3 | 0.6 | | | |

¹ No catalyst.

of chlorine, 9 mg. to the palladium-on-alumina, but no significant amount to the magnesium. It was evident that the contamination was a volatile organic chloride, the bulk of which was vented. Effective venting in loop tests was obtained by venting a surge tank from 300 to 250 p.s.i.g. about every 15 minutes.

Combinations of clay columns containing Mg. ribbon or Pd-on Al₂O₃ pellets have also proved effective in removing chlorine and maintaining low concentrations thereof.

EXAMPLE 6

Irradiation experience in a reactor has been obtained with a 2:1 mixture of ortho- and meta-terphenyls with 30% Omre high boiler. During an irradiation of 82 days in a thermal flux of $5 \times 10^{13}$ n./cm.²s. with sheath temperature of 450° C. to 500° C., the fouling deposition rate was less than 0.1 μg/cm.² hr. The fouling film was practically non-existent. The purification system consisted essentially of a Pd-on-alumina chlorine remover upstream of a clay adsorption column.

EXAMPLE 7

Zirconium hydriding

Chlorine in some form in the coolant in our experience is the most important promoter of zironium hydriding. Some test results which show this effect of chlorine are give in Table 5.

TABLE 5.—EFFECT OF CHLORINE ON HYDRIDING OF ZIRCALOY-2

| | No chlorine added | 50 p.p.m. C²HCl³ added initially |
|---|---|---|
| Temperature, ° C | 375 | 370 |
| Chloride in coolant at 370° C. p.p.m.: | | |
| At start | 0.8 | 8.2 |
| At end (after 67 hours) | 0.5 | 1.6 |
| Hydrogen absorbed, μg./cm.²h.: | | |
| Pickled surface | 0.39 | 9.4 |
| Oxidized surface | 0.01 | 2.1 |

EXAMPLE 8

Some test results showing protection against hydriding by removing chlorine are given in Table 6.

TABLE 6.—PROTECTION OF ZIRCONIUM ALLOYS AGAINST HYDRIDING IN CHLORINE CONTAMINATED ORGANIC COOLANT Ni-FREE ZIRCALOY-2 AT 400° C.

| Surface | Cl added | Water content, p.p.m. | Exposure, hours | H pickup, μg./cm.² | Hydriding rate, μg./cm.², hr. × 10³ |
|---|---|---|---|---|---|
| Pickled | 0 | 80-170 | 760 | 7.8 | 10 |
| Pickled and oxidized | 0 | 80-170 | 760 | 3.3 | 4 |
| Pickled | 20 | 4-45 | 36 | 1,590 | 44,000 |
| Pickled and oxidized | 20 | 4-45 | 36 | 7.5 | 210 |
| Abraded and oxidized | 20 | 4-45 | 36 | 155 | 4,300 |
| Do | 20 | 450-600 | 24 | 10 | 420 |
| Pickled | ¹ 9 | 90-230 | 720 | 19.7 | 27 |
| Pickled and oxidized | ¹ 9 | 09-230 | 720 | 1.4 | 2 |

¹ Cl removed to a concentration of less than 1 p.p.m. before exposure of specimens. Removal by Pd-Al₂O₃.

It is evident that substantially removing chlorine from the coolant protects zirconium alloys against detrimental hydriding.

We claim:
1. A method of preventing fouling and zirconium alloy hydriding in organic coolant systems contaminated with chlorine impurities comprising venting and degassing the coolant at a temperature of at least about 200° C., and then circulating the coolant into contact at elevated temperature with a treating agent selected from the group consisting of palladium-on-base catalyst and magnesium metal, sufficiently to maintain the substantially absence of chlorine in the system.
2. The method of claim 1 wherein the venting and degassing takes place in a surge tank purged with nitrogen.
3. The method of claim 1 wherein the organic coolant consists essentially of at least one of the group biphenyl, terphenyls and hydrogenated terphenyls.
4. The method of claim 1 wherein the catalyst base is one of (a) alumina and (b) silica gel, and the contact with the catalyst takes place at at least about 200° C.
5. The method of claim 1 wherein the contact with magnesium takes place at at least about 300° C.

References Cited

UNITED STATES PATENTS 3,052,738 9/1962 Bolt et al. _____ 260—666.5
3,063,927 11/1962 Ort et al. _____ 260—668
3,075,021 1/1963 Luvisi et al. _____ 260—668
3,294,484 12/1966 Ellis _____ 260—670

DELBERT E. GANTZ, Primary Examiner

C. E. SPRESSER, Jr., Assistant Examiner

U.S. Cl. X.R.
176—38, 92; 208—262